US007057582B2

(12) United States Patent
Ebersole, Jr. et al.

(10) Patent No.: US 7,057,582 B2
(45) Date of Patent: *Jun. 6, 2006

(54) RUGGEDIZED INSTRUMENTED FIREFIGHTER'S SELF CONTAINED BREATHING APPARATUS

(75) Inventors: John Franklin Ebersole, Jr., Bedford, NH (US); Mark Stanley Bastian, Manchester, NH (US)

(73) Assignee: Information Decision Technologies, LLC, Bedford, NH (US)

( * ) Notice: Subject to any disclaimer, the term of this patent is extended or adjusted under 35 U.S.C. 154(b) by 293 days.

This patent is subject to a terminal disclaimer.

(21) Appl. No.: 10/213,392

(22) Filed: Aug. 6, 2002

(65) Prior Publication Data
US 2003/0117342 A1   Jun. 26, 2003

Related U.S. Application Data

(63) Continuation-in-part of application No. 09/927,043, filed on Aug. 9, 2001, and a continuation-in-part of application No. 09/525,983, filed on Mar. 15, 2000.

(51) Int. Cl.
*G09G 5/00* (2006.01)
(52) U.S. Cl. ............................................. 345/8; 345/7
(58) Field of Classification Search ........... 128/201.25; 250/330, 332, 339.04; 340/573.1, 584, 586; 345/7, 8, 156, 9, 157, 426; 356/445, 317, 356/620; 359/204; 348/744; 600/111; 703/1
See application file for complete search history.

(56) References Cited

U.S. PATENT DOCUMENTS

| 5,420,828 | A | * | 5/1995 | Geiger ........................ 367/131 |
| 5,619,373 | A | * | 4/1997 | Meyerhofer et al. ........ 359/482 |
| 6,064,749 | A | * | 5/2000 | Hirota et al. ................ 382/103 |
| 6,255,650 | B1 | * | 7/2001 | Warner et al. .............. 250/330 |
| 6,417,774 | B1 | * | 7/2002 | Hibbs et al. ................. 340/584 |
| 6,478,025 | B1 | * | 11/2002 | Yort et al. ............. 128/201.25 |
| 6,547,720 | B1 | * | 4/2003 | Street .......................... 600/111 |
| 6,847,336 | B1 | * | 1/2005 | Lemelson et al. ............. 345/8 |
| 2002/0008625 | A1 | * | 1/2002 | Adams et al. ........... 340/573.1 |
| 2002/0072881 | A1 | * | 6/2002 | Saitta ............................ 703/1 |
| 2002/0171827 | A1 | * | 11/2002 | van den Engh ............. 356/317 |
| 2002/0196202 | A1 | * | 12/2002 | Bastian et al. ................. 345/8 |
| 2003/0048452 | A1 | * | 3/2003 | Johansen .................... 356/445 |
| 2003/0165017 | A1 | * | 9/2003 | Amitai ....................... 359/636 |
| 2004/0004547 | A1 | * | 1/2004 | Appelt et al. ............ 340/573.1 |

* cited by examiner

*Primary Examiner*—Vijay Shankar
*Assistant Examiner*—Nitin Patel
(74) *Attorney, Agent, or Firm*—Brian M. Dingman, Esq.; Mirick, O'Connell, DeMallie & Lougee

(57) ABSTRACT

The invention disclosed instruments a firefighter's SCBA with electronic and passive equipment, and protects this instrumentation from shock and undesirable environmental pollutant penetration. The invention provides for doing this through the use of a rugged cover on the equipment as well as soft equipment mounts. The cover provides the instrumentation with protection from impact as well as protection from contamination by environmental pollutants.

32 Claims, 5 Drawing Sheets

RUGGEDIZED INSTRUMENTED FIREFIGHTER'S SELF CONTAINED BREATHING APPARATUS

CROSS REFERENCE TO RELATED APPLICATION

This application is a Continuation in Part of "Augmented Reality-Based Firefighter Training System" PTO Ser. No. 09/525,983 filed Mar. 15, 2000 and of "Augmented Reality Display Integrated with Self-Contained Breathing Apparatus" PTO Ser. No. 09/927,043 filed Aug. 9, 2001.

GOVERNMENT RIGHTS

This invention was made with Government support under Contract Number N61339-01-C-1008 awarded by the Department of the Navy. The Government has certain rights in the invention.

FIELD OF THE INVENTION

This invention relates to protection of equipment used for real-time data acquisition for purposes of immersing a user in an augmented reality (AR) or virtual reality (VR) environment.

COPYRIGHT INFORMATION

A portion of the disclosure of this patent document contains material that is subject to copyright protection. The copyright owner has no objection to the facsimile reproduction by anyone of the patent document or the patent disclosure as it appears in the Patent and Trademark Office records but otherwise reserves all copyright works whatsoever.

BACKGROUND OF THE INVENTION

Information establishing the real-time position and orientation of a user's head is useful for Augmented Reality (AR) and Virtual Reality (VR). AR involves the ability to acquire images of the user's environment, augment those images with computer-generated elements, and display the composite images to the user, from the user's perspective. This information can be gathered by instrumenting a firefighter's Self Contained Breathing Apparatus (SCBA). This instrumentation is sensitive, however, and will not work if it is subjected to severe shock or other undesirable environmental hazards, such as penetration by water. The undesirable presence of shock or pollutants can result in negative effects ranging from bad calibration of equipment all the way to equipment failure or equipment destruction. Therefore, it is very desirable to protect SCBA equipment being used for AR and VR.

SUMMARY OF THE INVENTION

Mechanical and electronic components have been incorporated into a firefighter's SCBA and must be protected from shock and penetration by undesirable materials. The field in which the invention is currently used is that of virtual reality and augmented reality. The invention is used to protect equipment which is used to track a user's head and provide an image to that user as it is acquired and augmented in real time.

The invention instruments a firefighter's SCBA with electronic and passive equipment, and protects this instrumentation from shock and undesirable environmental pollutant penetration. The preferred embodiment of the invention provides a means for doing this through the use of a rugged cover on the equipment as well as soft equipment mounts. The cover provides the instrumentation with protection from impact as well as protection from contamination by environmental pollutants.

DETAILED DESCRIPTION OF THE PREFERRED EMBODIMENTS OF THE INVENTION

Equipment to be Protected

In the preferred embodiment of the invention, the SCBA to be used is a Scott Air Pack SCBA. The instrumentation for the SCBA consists of (1) a head mounted display (HMD) used to show an image to the user; (2) a camera used to acquire the image the user is looking at; (3) an InterSense InertiaCube used to measure the SCBA orientation, (4) two InterSense SoniDiscs used to measure the SCBA position; and (5) a prism used to shift the image in front of the user's eyes so that the image is in front of the camera. All of this equipment, except for the prism, has electrical connections that carry signals through a tether to a computer, which receives and processes these signals.

Layout of Components

Figure 1:
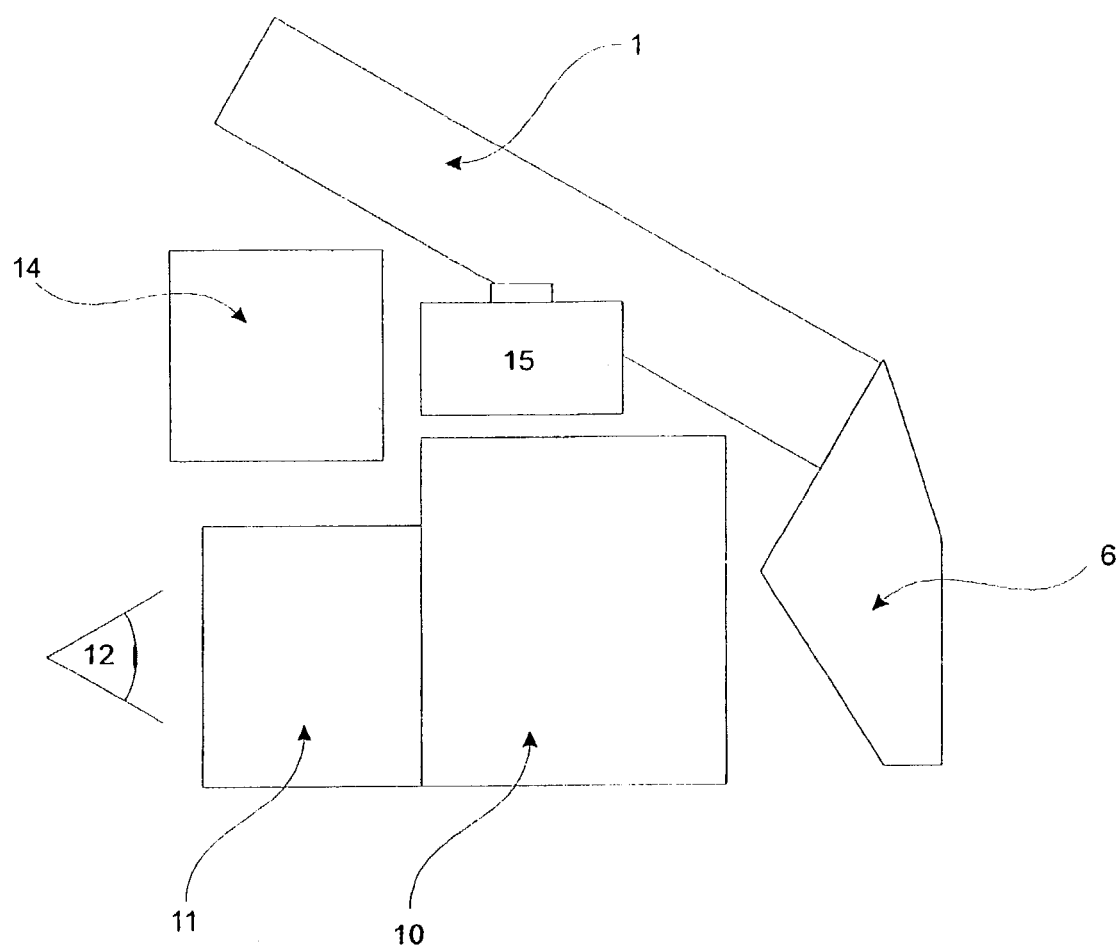
FIG. 1 schematically depicts the basic components of the preferred embodiment of the invention and one possible arrangement of them.

In FIG. 1, the eye 12 of the person wearing the SCBA (not shown) looks through the optics 11 to see the image formed on the display element inside the electronics portion 10 of the HMD. Separately, the image of the outside world is captured by camera 1, which looks through a prism 6 that has two reflective surfaces to bend the path of light to the camera 1. The tracking components, in this case from InterSense, include the InertiaCube 14 and two SoniDiscs 15 which are positioned on either side of the camera, one going into the figure, and one coming out of the figure. The InertiaCube 14 can be placed anywhere there is room on the structure, but the SoniDiscs 15 must be at the top of the structure in order to have access to the external tracking components.

Figure 2:
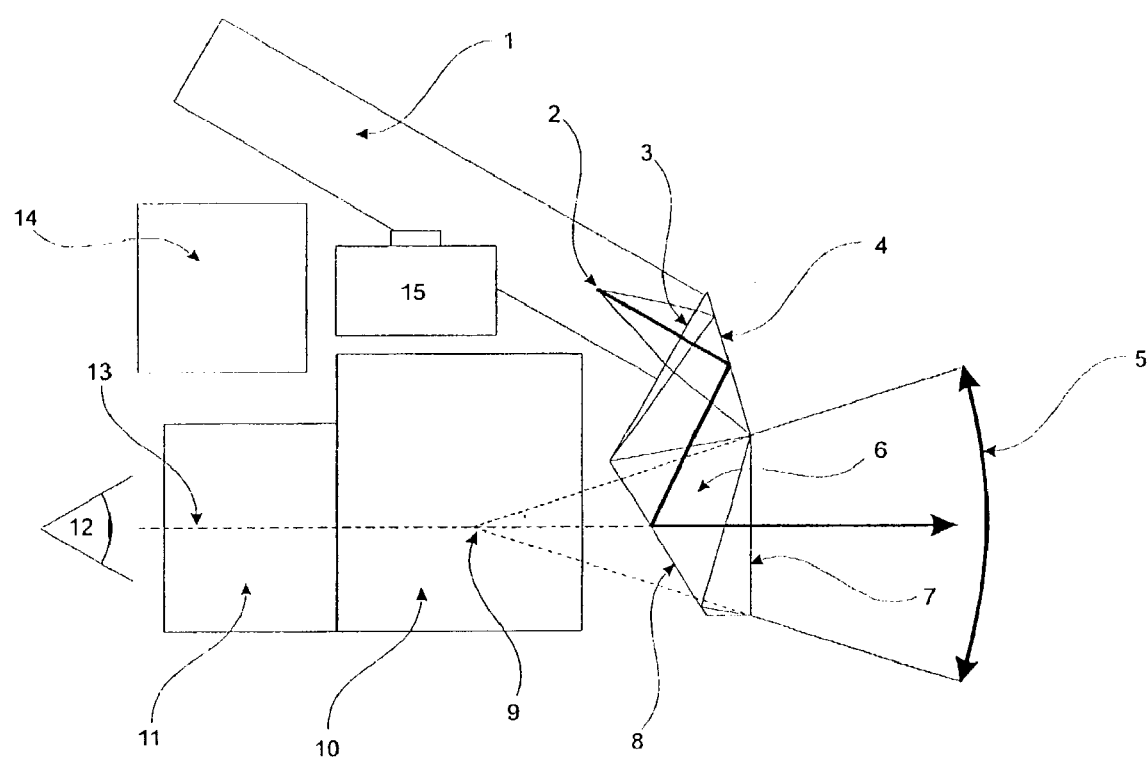
FIG. 2 shows the same components with an overlay of the optical paths and relationships to the components.

FIG. 2 shows a detailed sketch of the light paths. Upon entering the prism 6 at the polished transparent entrance point 3, the FOV 5 of the camera 1 is temporarily reduced due to the refractive index of the glass, preferably SFL6 as it has a very high index of refraction while maintaining a relatively low density. This reduced FOV 5 is reflected first off mirrored surface 4 and then mirrored surface 8 before exiting through surface 7. Upon exit, the FOV 5 is restored to its original size, and any aberrations due to the glass is eliminated since the FOV 5 is entering and exiting the prism perpendicular to surfaces 3 and 7. Using this layout, the image captured by the camera 1 is effectively taken from the virtual eye-point 9, even though the real eye-point of the camera is at point 2.

In FIG. 2, the virtual eye-point 9 would ideally be at the same point as the user's eye-point 12. To make this happen, however, the optics would have to be bigger. It is preferred to use smaller optics that place the virtual eye-point 9 slightly forward of the user's eye-point 12. This arrangement tends to be acceptable to most users. Even though the eye-point 9 isn't lined up exactly with the eye 12, the HMD (10 and 11) as well as the prism 6 are all co-located on the same optical axis 13, thereby minimizing the disorientation of the user.

To achieve the same eye-point 9 without the use of the prism or mirrors would require placing the camera at the same location as the user's eye 12 as well as HMD 10 and 11. By folding the light path with the prism, the camera 1 can be placed above the other components, thereby achieving a relatively compact solution.

Figure 3:
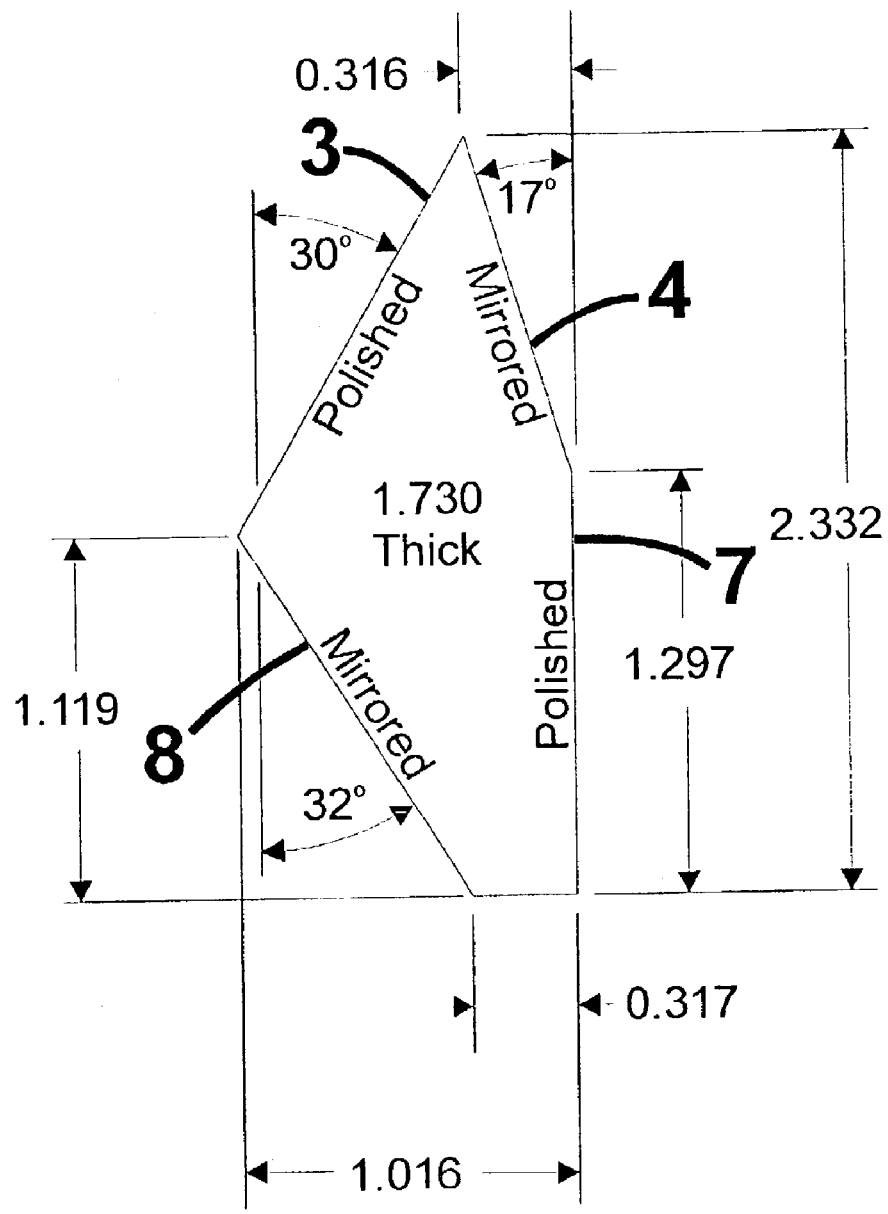
FIG. 3 is a dimensioned engineering drawing of the prism of FIG. 1.

FIG. 3 shows the detailed dimensions and descriptions of the preferred prism. Surfaces 4 and 8 are mirrored and surfaces 3 and 7 are polished. All other surfaces are plain or preferably painted black. All units in the drawing are inches. The prism can be mounted to the SCBA by fixing mounting plates that define tapped holes on the two sides of the prism. The prism material is preferably SFL 6,which has a refractive index of 1.8.

If two mirrors are used instead of the prism, then the utility of producing a right-side-up image is accomplished because of the two reflections. However, if the FOV 5 of the camera 1 is relatively large, then the mirrors required to fold over the FOV 5 would have to very large in order to clear the case of the camera 1.

An alternate solution to the use of the prism is to place the camera 1 looking straight down using one mirror. So long as the image from the camera 1 can be processed with video equipment to mirror back the image it would work, but it will most likely either place the camera 1 in an inconvenient location, or the mirror would have to be very large.

If mirrors are used, there are several choices for materials. The lightest and cheapest are plastic mirrors. A step up in quality would be the use of glass mirrors, especially if they are front-surface mirrors (versus the typical back-surfaced mirrors used in households). The highest durability and quality can be achieved with metallic mirrors. Metallic mirrors, preferably aluminum, can be manufactured that have tough, highly reflective surfaces. Metal mirrors can be made to have built-in mounting points as well, enabling a mirror very well suited for the needs of the invention for light weight, compact size, and durability.

The very simplest alternative method of camera arrangement would be to put the camera parallel to and directly above the optical axis of HMD 10 and 11. This method negates the need for a prism or mirrors, but it loses all of the benefit of the virtual eye-point on the optical axis of the HMD 10 and 11.

Equipment Shock and Contamination Protection

The equipment is protected by a plastic cover which protects the overall assembly from both shock and penetration by foreign agents, such as water and dirt. The InertiaCube and SoniDiscs are somewhat easy to uncalibrate and are sensitive to shock. This provides a great deal of shock protection.

Figure 4:
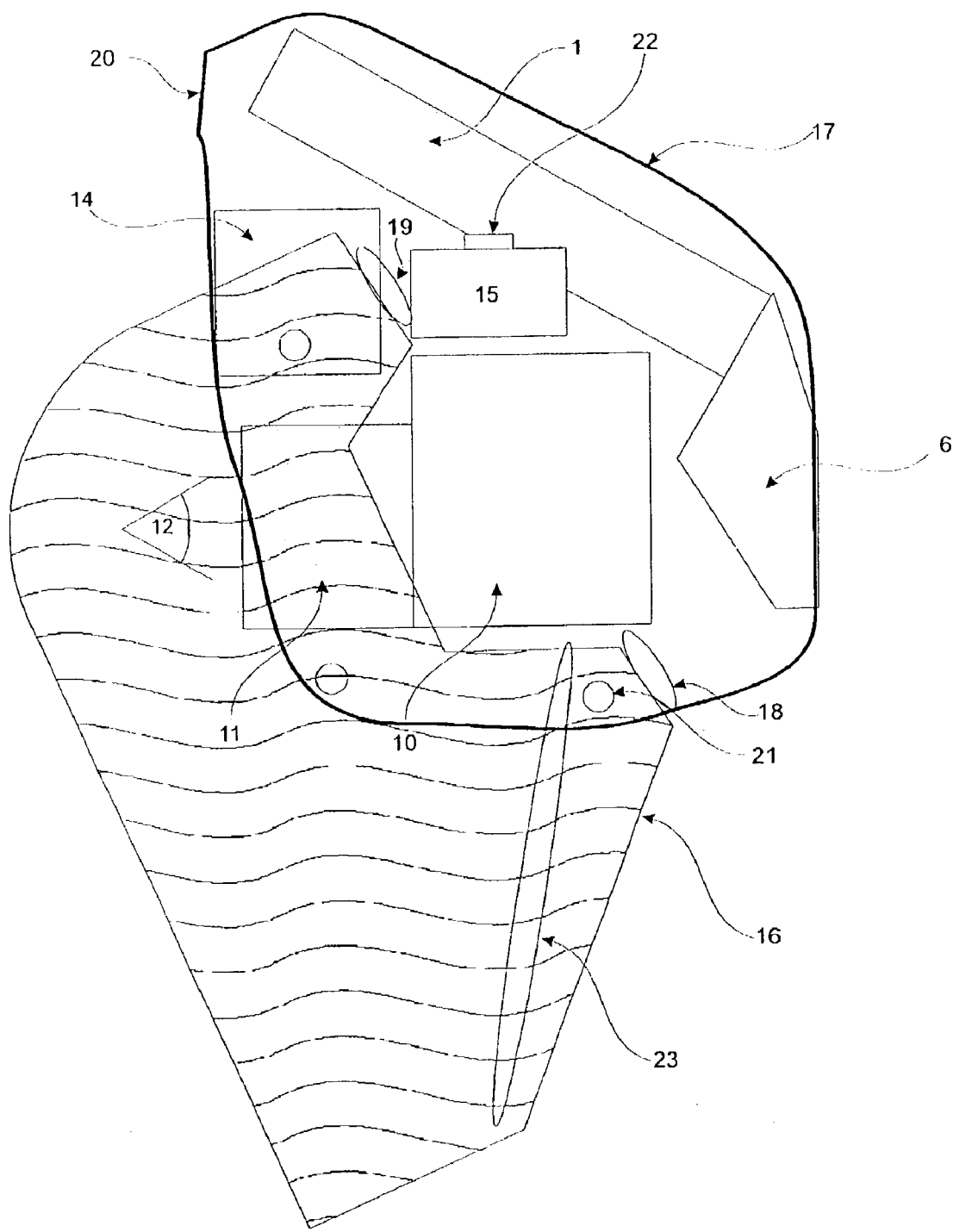
FIG. 4 shows the components of FIG. 1 in relation to the SCBA face mask and protective shell.

In FIG. 4 one potential issue with the HMD 10 is the build-up of heat, as the HMD gives off a substantial amount. One method is to put vent holes (not shown) in the plastic cover 17, allowing direct access to cool air outside the cover 17, however that can allow in foreign contaminants. The preferred method is to have one-way valves 18, 19 inside the SCBA mask 16. In this preferred method, as the user breathes in air, the air comes in through the mouth piece as is normal, but then the air gets redirected by a one-way valve 23, up through a one-way valve 18 and thus into shell 17, then over the electronics, and away from the electronics through another one-way valve 19 before entering the user's airway. When exhaling, the moist, warm air would get a direct path to the outside via the one-way valve 23. This redirection of air can be preferably accomplished through the use of typical, one-way rubber valves.

Equipment Mounting and Connections

Figure 5:
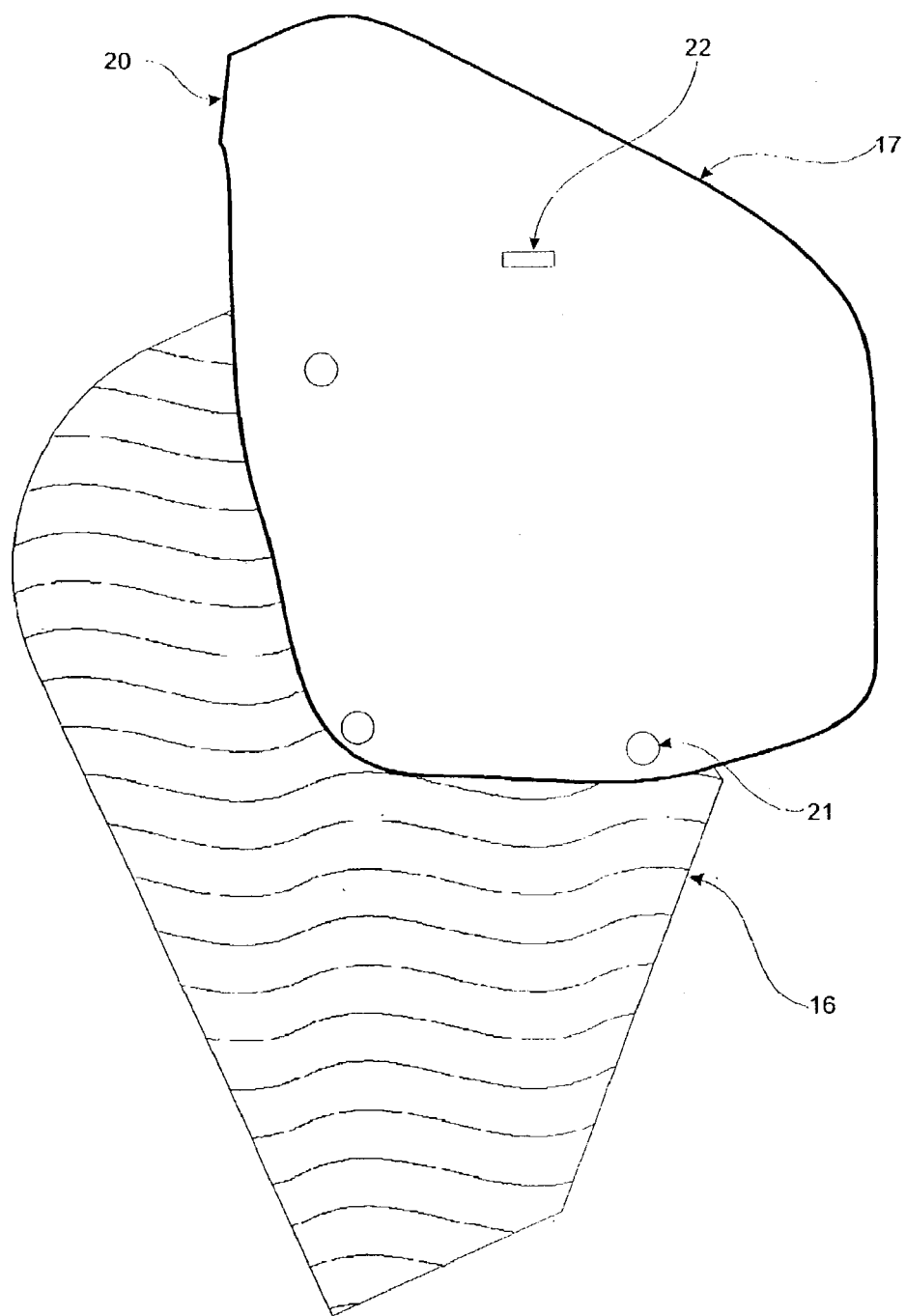
FIG. 5. shows externally visible components, including the SCBA and protective shell.

The HMD is mounted directly to the SCBA. The InertiaCube and SoniDiscs are attached rigidly to the camera/prism assembly (or mirrors if those are used), locking their positions together. By locking the position tracking equipment directly to the camera/prism assembly, one can ensure that the computer-generated imagery will correspond to the camera's position. A hard plastic electronics enclosure or shell 17 FIG. 5 attaches to the SCBA 16 preferably with bolts 21, providing a means for hiding from view and protecting from the elements all electronic equipment, except for the SoniDisc speakers 22, which must be exposed to the air to allow the separate tracking devices (not shown) to receive the ultrasonic chirps coming from the SoniDiscs. The plastic shell 17 that surrounds all of the equipment should be made of a tough material, such as nylon, that can withstand the shock of being dropped, yet is slightly bendable, allowing for a little bit of inherent shock-mounting for the equipment. If this is not sufficient, then the HMD 10, prism 6, camera 1, and/or tracking equipment 14 and 15 can be mounted to the SCBA 16 and plastic shell 17 with rubber mounting points (not shown). In this case the HMD, prism, camera, and/or tracking equipment can all be mounted together with a very rigid structure, for example a metallic frame (not shown). That rigid structure could then be mounted separately to the plastic shell, preferably with shock-absorbing mounts.

The signal wires (not shown) coming from the instrumentation 1, 10, 14, and 15 come out of the plastic shell 17 through a single hole 20 with built-in strain relief, ensuring that the cables cannot be pulled out of the plastic shell 17 through normal use, and also ensuring that pulling on the cables will not create unacceptable cable wear. To maximize ease of use and maintenance, the cables coming out of the plastic shell can be attached to a single, specialized connector either mounted on the plastic cover at the exit point 20, or preferably attached to the belt of the wearer. From that connector, another single cable connects this one connector to the computer (not shown) and other equipment (not shown) by splitting the cable into its sub-connectors as needed by the various components. The use of this specialized connector provides for easy connect and disconnect of the equipment from the user.

Protection Against Misuse

To prevent the user from accidentally using the device in a real fire emergency, the protective design uses an obvious indicator to the user that the device is for training use only, and not for use in real emergencies. The preferred method uses an alternating yellow and black color scheme to get the user's attention that this is not a standard part. Additionally, a sign is used which indicates that the device is to be used for training purposes only.

List of Equipment That Can Be Used to Reduce this Invention to Practice

Scott Air-Pac SBCA

Panasonic GP-KS162 Camera with a 7 mm lens. This camera suits the needs of the preferred embodiment due to its very small size (diameter), as well as having an effective eye-point that is not too far inside the camera. The primary reason the prism is so large is because of the need to ensure that the camera's FOV clears the case of the camera. A camera with a larger lens and/or with an eye-point farther inside the camera would require a significantly larger prism.

Custom prism (shown in FIG. 3) with an index of refraction of 1.8 or greater.

Virtual Research V6 HMD with the 60 degree diagonal FOV option.

InterSense IS-600 InertiaCube and SoniDiscs. The InertiaCube and SoniDiscs are equipment from the InterSense IS-600 line of tracking equipment. If the end use of the SCBA calls for the use of tracking equipment other than the IS-600 line, the invention could readily be adapted to protect equipment from, for example, the IS-900 line from InterSense, and 3rd Tech's optical tracking equipment. The shell would just need to be modified slightly to hold the different tracking equipment in place.

ALTERNATE EMBODIMENTS OF THE INVENTION

The invention may be implemented with other variations. The wires connecting the specialized connector to the computer need not be continuous. Instead, a wireless system may be used in which the specialized connector on the user connects to the transmitter/receiver system that the user is carrying, which transmits and receives signals to and from the computer. The wires from the instrumentation can be held in place for strength and ease of assembly by soldering posts for soldering the wires to screw-down terminals, or they can be quick release connectors.

The preferred embodiment uses a non-see-through HMD. Additionally, a see-through HMD may be used for this invention, which would not need the prism and camera, but instead the SoniDiscs and InertiaCube would be attached directly to the see-through HMD.

If two prisms and two cameras were used, a stereo arrangement could be accomplished.

What is claimed is:

1. A ruggedized, instrumented firefighter's Self Contained Breathing Apparatus (SCBA) for use in augmented reality (AR) or virtual reality (VR) applications, comprising:
   a firefighter's SCBA;
   instrumentation carried by the SCBA, comprising a head mounted display (HMD) for displaying to the user an AR or VR image, tracking equipment that measures the position and orientation of the SCBA, and an image shifter; and
   a covering device which protects said SCBA and said instnunentation from shock and environmental hazards.
2. The ruggedized firefighter's SCBA of claim 1 in which the HMD is a non-see-through HMD.
3. The ruggedized firefighter's SCBA of claim 1 in which the HMD is a see-through HMD.
4. The ruggedized firefighter's SCBA of claim 1 in which the instrumentation comprises an imaging video camera.
5. The ruggedized firefighter's SCBA of claim 4 in which the camera is used to acquire an image of the real world in the user's field of view.
6. The ruggedized firefighter's SCBA of claim 5 in which the image shifter shifts the image acquired by the camera.
7. The ruggedized firefighter's SCBA of claim 5 in which the instrumentation defines two optical paths that are used to produce a stereo simulation to the user.
8. The ruggedized firefighter's SCBA of claim 7 wherein the instrumentation comprises two cameras and two prisms.
9. The ruggedized firefighter's SCBA of claim 1 in which the image shifter comprises a prism.
10. The ruggedized firefighter's SCBA of claim 1 in which the image shifter comprises a set of two mirrors.
11. The ruggedized firefighter's SCBA of claim 10 in which the mirrors are made of glass.
12. The ruggedized firefighter's SCBA of claim 10 in which the mirrors are made of metal.
13. The ruggedized firefighter's SCBA of claim 10 in which the mirrors are made of plastic.
14. The ruggedized firefighter's SCBA of claim 1 in which the covering has a color scheme that indicates that the SCBA is to be used for training purposes.
15. The ruggedized firefighter's SCBA of claim 1 in which the covering has signage which indicates that the SCBA is to be used for training purposes.
16. The ruggedized firefighter's SCBA of claim 1 in which the instrumentation is connected via a cable to the instrumentation's associated computer equipment at one location by a single connector.
17. The ruggedized firefighter's SCBA of claim 16 in which the single connector has soldering posts for connections.
18. The ruggedized firefighter's SCBA if claim 16 in which the single connector has screw down connections.
19. The ruggedized firefighter's SCBA of claim 16 in which the single connector has quick-release connections.
20. The ruggedized firefighter's SCBA of claim 1 in which the covering device also provides protection against water, dirt, and contaminant penetration.
21. The ruggedized firefighter's SCBA of claim 1 in which all wires and instrumentation are hidden from view by the cover and the SCBA.
22. The ruggedized firefighter's SCBA of claim 1 in which the image shifter comprises one mirror.
23. The ruggedized firefighter's SCBA of claim 22 in which the mirror is made of glass.
24. The ruggedized firefighter's SCBA of claim 22 in which the mirror is made of plastic.
25. The ruggedized firefighter's SCBA of claim 22 in which the mirror is made of metal.
26. The ruggedized firefighter's SCBA of claim 22 in which the image shifter further comprises an electronic means for reversing the image, to achieve the affect that two mirrors have, ensuring that the image is upright and not reversed.
27. The ruggedized firefighter's SCBA of claim 1 in which the covering device defines air holes to provide coolig of the components.
28. The ruggedized firefighter's SCBA of claim 1 further comprising means to use the breathing action of the user to draw air over the electronic equipment to provide cooling of the components.
29. The ruggedized firefighter's SCBA of claim 1 further comprising computer equipment which is used to perform processing of simulation data, but is not worn by the user, and a wireless system to provide an electronic connection for the equipment on the SCBA to the computer equipment.
30. The ruggedized firefighter's SCBA of claim 1 in which the tracking equipment comprises a microphone.
31. The ruggedized firefighter's SCBA of claim 1 in which the tracking equipment comprises a speaker.
32. The ruggedized firefighter's SCBA of claim 1 in which the tracking equipment comprises an optical receiver.

* * * * *